Nov. 24, 1959     L. O. CARLSEN ET AL     2,913,962
GEAR CUTTING MACHINE AND METHOD AND CUTTER THEREFOR
Filed Sept. 25, 1956                     3 Sheets-Sheet 1

INVENTORS
LEONARD O. CARLSEN
ROBERT F. PIGAGE
BY *Richard W. Treverton*
ATTORNEY

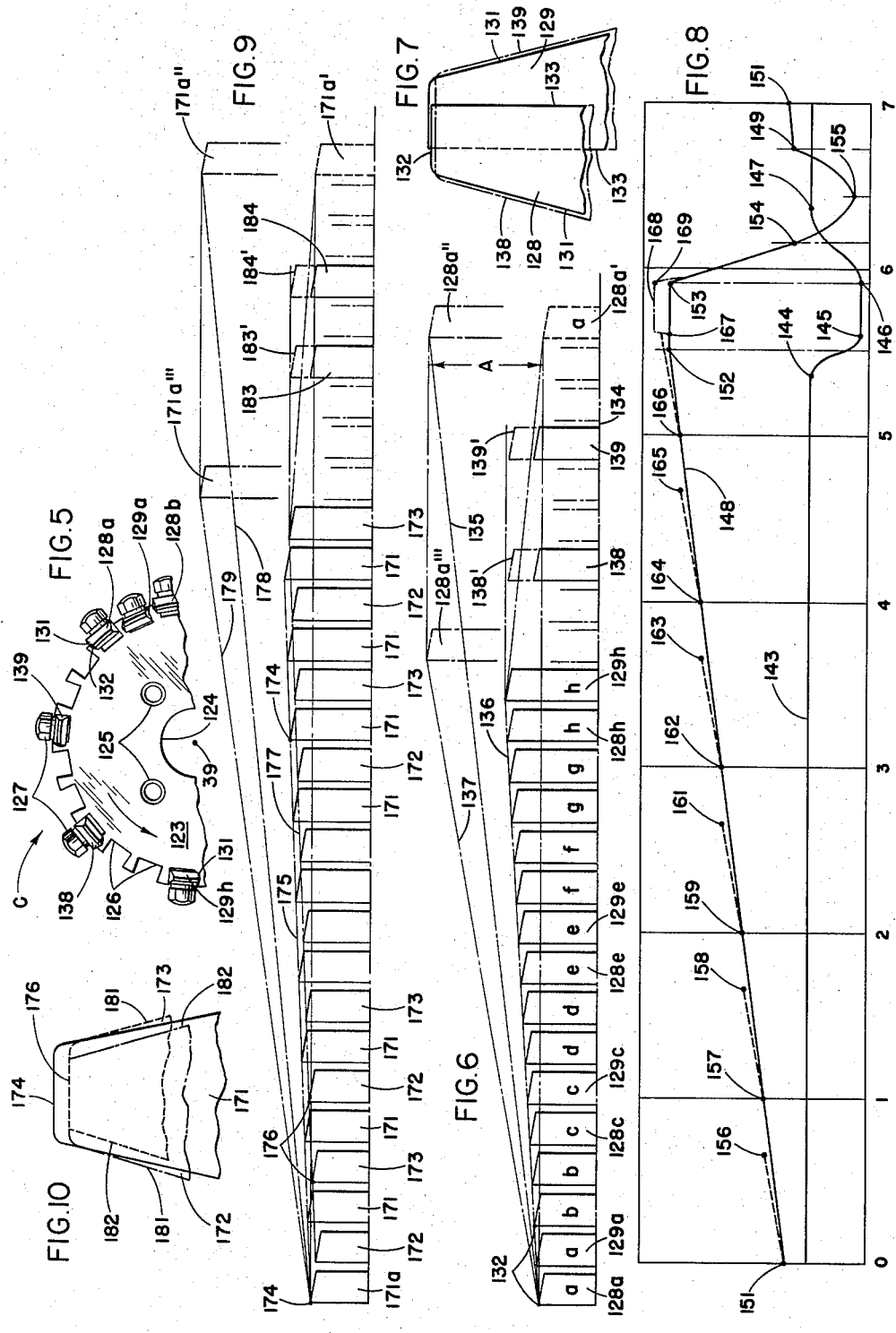

United States Patent Office 2,913,962
Patented Nov. 24, 1959

2,913,962

GEAR CUTTING MACHINE AND METHOD AND CUTTER THEREFOR

Leonard O. Carlsen, Rochester, and Robert F. Pigage, Irondequoit, N.Y., assignors to The Gleason Works, Rochester, N.Y., a corporation of New York Application September 25, 1956, Serial No. 611,893

25 Claims. (Cl. 90—5)

The present invention relates to an improved gear cutting machine and method of the kind in which both rough and finish cutting are accomplished in the same cutting cycle, and to an improved cutter for use in such cutting.

It has heretofore been known, as disclosed in Patents Nos. 2,273,908 and 2,384,499 of A. L. Stewart, to rough and finish gears by the non-generating or form cutting method with a rotary cutter having a series of roughing blades followed by a pair of finishing blades, the roughing blades all being of the same height and the finishing blades being slightly higher. As the cutter rotates it is alternately fed into the workpiece and withdrawn, with the result that during the infeed the roughing blades cut progressively deeper and that by the withdrawal the finishing blades are prevented from cutting. However, at the conclusion of the rough cutting operation the cutter is held at full depth so that the finishing blades cut.

The known method requires a machine having a special feed cam which will effect the particular number of infeed and withdrawal motions per tooth cutting cycle that is required for gears of a given design. For cutting gears of coarser or finer pitch, requiring a larger or smaller number of revolutions of the cutter to remove the stock from each tooth space, a different feed cam is needed. Replacement of this cam is difficult and time-consuming, and hence use of the method has been limited to those cases in which there are long production runs of gears of one size.

One object of the present invention is to eliminate the periodic withdrawals of the cutter during its infeed, which withdrawals are required in the previously known method in order to prevent premature cutting by the finishing blades. Another object is an improved machine, cutter and method whereby a standard feed cam may be employed, and whereby gears of any size within the range of the machine may be produced after making the necessary machine settings and mounting a suitable cutter.

The foregoing and other objects and advantages of the invention will appear from the following description made with reference to the accompanying drawings, wherein:

Fig. 5 is a fragmentary face view of a typical cutter for use in carrying out the present method;

Fig. 6 is a schematic development of the cutter, showing all of the blades thereof;

Fig. 7 is a diagrammatic view further illustrating the cutter blade arrangement shown in Figs. 5 and 6;

Fig. 8 is a diagram showing the operating cycle of the machine; and,

Figs. 9 and 10 are views respectively like Figs. 6 and 7 but illustrating a modified cutter.

Figure 1:
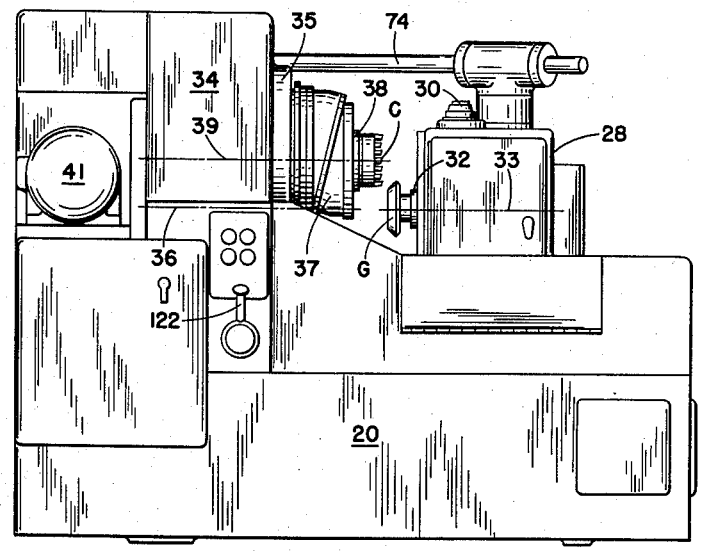
Figs. 1 and 2 are respectively a front elevation and a plan view of the machine.
Figure 2:
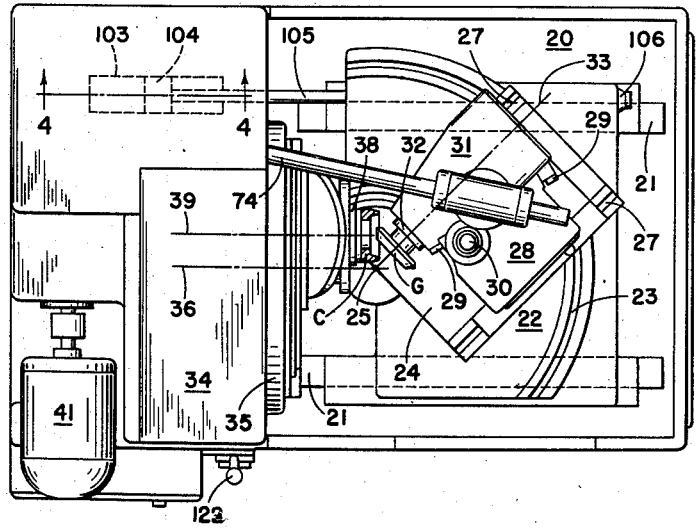

The particular machine shown in the drawings is adapted to cut gears either by the generating method or by the non-generating method with which the present invention is concerned. The machine comprises a frame 20 having ways 21 along which a sliding base 22 is movable horizontally. The sliding base has an arcuate way 23 upon which a swinging base 24 is adjustable about a vertical axis 25, and the swinging base in turn has ways 27 along which a column 28 is adjustable horizontally. On the column are vertical ways 29 along which a work head 31 is adjustable vertically by turning an adjusting screw 30. The work head has a spindle 32 journaled therein for rotation about a horizontal axis 33. By these several adjustments a gear or similar workpiece G mounted on the spindle may be properly positioned, as shown in Fig. 2, to have teeth cut therein by a rotary face mill cutter C. In Fig. 1 the machine has not been so adjusted, but instead the swinging base is so positioned that spindle axis 33 is parallel to ways 21.

The frame 20 includes a cradle housing 34 in which a cradle 35 is mounted for rotation about a horizontal axis 36 which intersects vertical axis 25. On the cradle is adjustably mounted a cutter spindle housing 37 in which the spindle 38 for cutter C is mounted for rotation about axis 39. The adjustments for housing 37 are such that the cutter may be set at various radial distances from cradle axis 36 and so that the cutter axis may be adjusted either into parallelism with the cradle axis, as shown in Figs. 1 and 2, or into various angular positions relative thereto.

Figure 3:
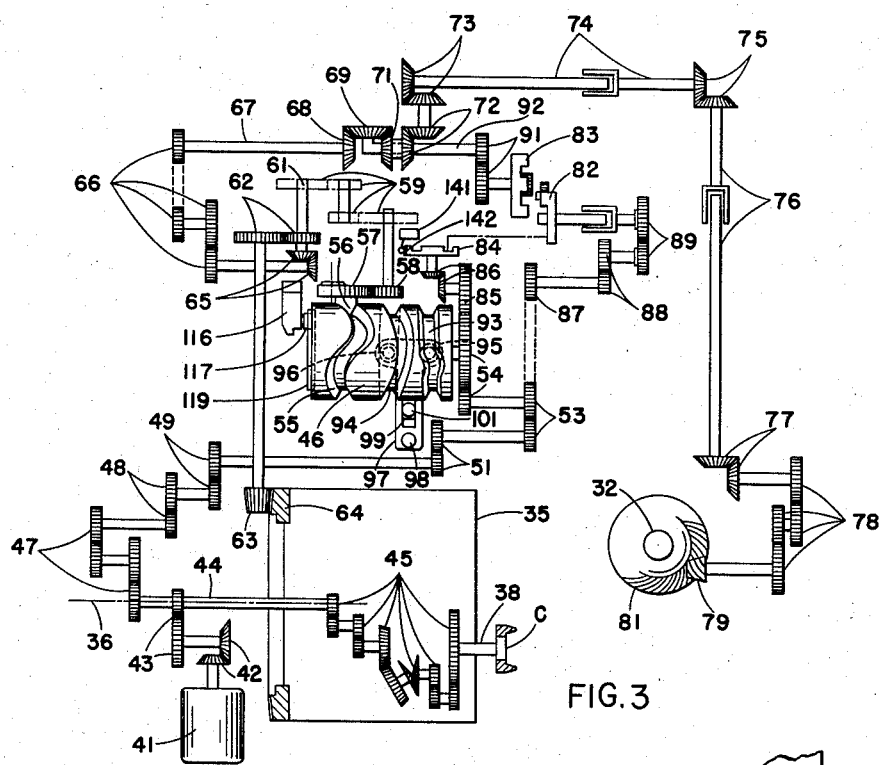
Fig. 3 is a drive diagram of the machine.

The machine is driven by a two-speed motor 41 which, as shown in Fig. 3, is connected to the cutter spindle through bevel gears 42, cutter-speed-change gears 43, a main drive shaft 44 extending along the cradle axis 36, and gearing 45 in the cradle and arranged to accommodate the radial and angular adjustments of the cutter that are referred to in the preceding paragraph. When the machine is to be used in a generating process the work spindle 32 and the cradle 35 are rotated back and forth in a predetermined angular velocity ratio by a cam 46 which is journaled in the frame and is driven from the shaft 44 through cycle-speed gears 47 and reduction gears 48, 49, 51, 53 and 54. The cam 46 has a generating track 55 engaged by a roller 56 mounted on a segmental gear 57 which meshes with a gear 58, the arrangement being such that for each complete revolution of the cam the gear 58 is rotated through a certain angle in one direction and then is returned by being rotated through the same angle in the opposite direction. The gear 58 drives the cradle 35 through angle-of-roll change gears 59, shaft 61, gears 62, hypoid pinion 63 and a ring gear 64 secured to the cradle. The work spindle 32 is driven from shaft 61 through bevel gears 65, ratio-of-roll change gears 66, shaft 67, a differential mechanism comprising drive gear 68, planet gear 69 and driven gear 71, bevel gears 72, bevel gears 73, overhead horizontal telescoping shaft 74, bevel gears 75, vertical telescoping shaft 76 journaled in the column 28, bevel gears 77, index change gears 78, hypoid pinion 79 and gear 81 on the work spindle 32, the gears 77, 78, 79 and 81 being in the work head 31. When the machine is to be operated by the form cutting or nongenerating method, at least one of the gears 59 is removed and the cradle 35 and the shaft 67 are clamped against rotation.

Intermittent indexing of the work spindle is effected, once for each rotation of cam 46, by a Geneva-type index mechanism comprising a drive member 82 and driven member 83, so designed that when the drive member is rotated in the same plane as the driven member the latter is turned intermittently. However the drive member is arranged to be shifted axially into and out of this plane by a cam 84. This cam is driven through a gear 85 which meshes with one of gears 54, and bevel gears 86. This gearing is of such ratio that cam 84 makes the same number of turns as cam 46. Drive member 82 is driven from one of gears 53 through gear 87, gears 88 and gears 89. The intermittent rotation of driven member 83 is imparted to the work spindle 32 through the differential gearing 68, 69, 71, the planet gear 69 thereof being rotated around the axis of side gears 68 and 71 by means of gears 91 and shaft 92.

The indexing of work spindle 32 described above occurs at a time when the sliding base 22 is withdrawn to draw the workpiece G clear of the cutter C. This withdrawal is effected either by non-generating feed track 93 or by generating feed track 94 of cam 46. One of these tracks is engaged by its follower roller, 95 or 96, depending upon whether the non-generating or generating method is to be used. Both rollers are carried by a lever 97 which is fulcrumed at 98 to the frame. Adjustable on the lever, radially of fulcrum 98, is a block 99 that is pivoted by a pin 101 to a block 102 slidable in a transverse slot, i.e. a slot perpendicular to the plane of Fig. 4, in a cylinder 103 which is slidable axially in the frame 20. In the cylinder is a piston 104 that is adjustably connected to the sliding base 22 by a rod 105. By turning a screw threaded nut 106, Fig. 2, the effective length of rod 105 can be changed.

The arrangement is such, considering the piston to be held by fluid pressure in its left limit position in cylinder 103, that when the machine is set-up for cutting by the generating method, with roller 96 engaged in cam track 94, the cam on each rotation swings the lever 97 counterclockwise about pivot 98, and thereby moves to the left the entire assembly comprising the cylinder 103, the piston 104 and the work head. This action takes place during the last part of the return roll of the cradle and work spindle and serves to bring the workpiece G into position for cutting by the tool C during the ensuing forward roll of the cradle and work spindle effected by cam track 55 and gear segment 57. Throughout such forward roll a dwell in cam track 94 is effective to hold the workpiece G in cutting position. After this forward roll is completed, and during the return roll, the cam track 94 acts to swing the lever clockwise, thereby withdrawing the sliding base and the workpiece carried by it, and then the afore-described index mechanism functions to advance the workpiece by one pitch.

When the machine is set-up for operating by the non-generating method, the roller 95 is engaged in cam track 93. The action is then similar to that described above insofar as concerns withdrawal of the sliding base to permit indexing, but instead of the sliding base being fully advanced at the initiation of cutting, the cam track 93 is so shaped that it gradually feeds the sliding base forwardly as cutting proceeds.

Whichever cutting method is employed, the adjustment of block 99 radially of lever 97 may be employed to vary the magnitude of the feed motion effected by the cam.

Figure 4:
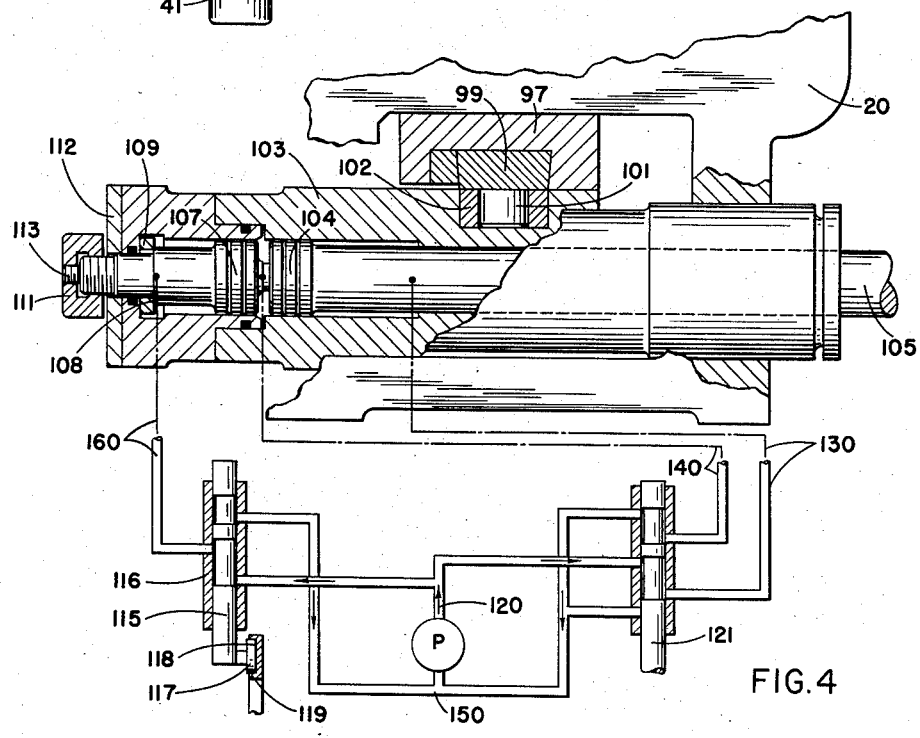
Fig. 4 is in part a detail vertical sectional view in plane 4—4 of Fig. 2 and in part a hydraulic diagram.

To effect a greater withdrawal of the sliding base, to enable mounting workpieces on the work spindle and subsequently removing them, the piston 104 is moved by hydraulic pressure to the limit of its stroke to the right in cylinder 103. The opposite or working limit position of the piston is determined by its abutment with an auxiliary piston 107 whose limit position, to the left in Fig. 4, is determined by its abutment of its shoulder 108 with a ring 109 that is secured in the cylinder. This ring supports a key which engages a keyway in the piston to prevent the latter from rotating. The opposite limit position of the piston 107, to the right in Fig. 4, is determined by abutment of a nut 111 with a plate 112 secured to the end of the cylinder. The nut is screw-threaded to the reduced-diameter end portion of the piston 107 that protrudes through the cylinder head. The stroke of piston 107 may be adjusted by turning nut 111 after first loosening a lock screw 113.

Piston 107 is controlled by a valve 115 which is slidable in a valve housing 116, Figs. 3 and 4, that is mounted on frame 20. The valve carries a roller 117 engaging in a track or groove 118 of a cam 119 which is secured to and in effect is a part of cam 46. The operation of the valve will be understood from Fig. 4 in which is also shown a valve 121 for controlling the piston 104. Valve 121 is operated by the valve handle 122, Figs. 1 and 2. Hydraulic pressure is supplied to the system by a pump P which may be driven either by motor 41 or by an auxiliary motor.

The particular cutter C shown in Figs. 5 to 7 is of the inserted blade type having a disc-like cutter head 123 with a central bore 124 for seating on the nose of spindle 38 and apertures 125 for screws, not shown, which secure the cutter to the spindle. About its periphery the head has a number of equi-spaced notches 126 each adapted to receive the shank of a cutter blade whose cutting portion projects forwardly from the front face of the head in a direction generally parallel to the cutter axis 39, each blade being secured to the head by a screw 127. The cutter shown has twenty-four blade spaces, i.e. twenty-four notches 126, but only eighteen cutting blades. Sixteen of these are roughing blades and two are finishing blades. The roughing blades are divided into eight outside cutting blades 128, i.e. blades adapted to cut the concave surfaces of the gear teeth, which blades are individually designated 128a to 128h, inclusive, and eight inside cutting blades 129, designated individually as 129a to 129h inclusive, for cuting the convex surface of the gear teeth. As shown in Fig. 7 each blade has a side cutting edge 131 for cutting the tooth sides, a tip cutting edge 132 for cutting the tooth bottoms, i.e. the bottoms of the spaces between adjacent teeth, and a non-cutting or clearance side edge 133. As shown in Fig. 6 the roughing blades progressively increase in height, i.e. in extent in an axial direction from a reference plane 134 which may be considered to be the face plane of head 123.

The magnitude of the progressive increase in height of the roughing blades, from blade 128a to blade 129h, is related to the rate of infeed effected by cam track 93. The feed of the work relative to the cutter in the general direction of the cutter axis, i.e. upwardly in Fig. 6, means that for each complete revolution of the cutter, the blade 128a will advance by distance A from position 128a' to position 128a". If all blades 128 and 129 were of equal height, their effective height, due to the infeed, would place their tip edges 132 along line 135. Each roughing blade 129a through 129h, would cut to a depth greater than the preceding blade by one twenty-fourth of A. However due to the omission of eight roughing blades in advance of blade 128a, this first blade would be required to cut nine twenty-fourths of A. In other words, insofar as cutting load is concerned blade 128a would in effect be positioned at 128a''', far above line 135.

However, the progressive increase of height of the roughing blades, to cause their tip edges 132 to lie along line 136 in Fig. 6, together with the infeed produced by cam track 93, causes them to lie, in effect, along line 137. Thus each roughing blade, including the first blade 128a, cuts to a depth equal to one-sixteenth of the distance A.

The cutter includes one outside finishing blade 138 and one inside finishing blade 139. These blades are of the same height, which is so small, relative to the height of blade 129h, that even during the infeed effected by cam track 93, the finishing blades clear the tooth space and have no cutting action. However after the cam-effected infeed is concluded the piston 107 operates to advance the work far enough to cause the side edges, but not the tip edges, of the finishing blades to cut, the effective relation of the edges of the finishing blades to those of the roughing blades being as indicated by broken lines in the diagram Fig. 7. As shown in Figs. 5 and 6 the blades 138 and 139 are spaced widely from each other so that only one of them will be in the cut at a time. For this same reason, to prevent blade 138 from cutting while blade 129h is still cutting, and also to allow time for the sliding base to be advanced by piston 107, blade 138 is spaced a substantial distance back of blade 129h. To prevent the first roughing blade 128a from cutting the finished tooth space the work must be withdrawn, and to allow time for this the blade 128a is spaced a substantial distance back of the second finishing blade 139.

It will be understood that the construction of the cutter, i.e. whether it has inserted blades as shown, or blades integral with cutter head, or blades arranged in segments, is immaterial insofar as concerns the present invention. However it is important, at least when using a feed cam with an uninterrupted feed path, that the progressive increase in blade height, along line 136 of Fig. 6, be appropriate for the particular rate of infeed, this rate depending in part upon the adjustment of block 99 in feed lever 97 and in part upon the ratio of the number of turns of the cutter for one rotation of feed cam 46, this ratio being determined by the particular change gears 43 and 47 that are selected. In the cutting cycle depicted in Fig. 8 this gearing is such that the cutter makes seven revolutions for each revolution of the cam 46.

In order to produce high quality tooth surfaces as rapidly as possible the cutter is rotated at relatively low speed while the finishing blades cut and at relatively high speed during rough cutting. For this purpose a speed control switch 141 is provided for the two-speed drive motor 41. This switch is operated by a cam track 142 provided on index control cam 84. In the particular machine that is illustrated the drive motor operates at about 1800 r.p.m. in one position of the switch and at about 600 r.p.m. when the switch is reversed. This means that for finishing the cutter speed is only one-third that employed for roughing.

The numerals 0 to 7 along the bottom edge of the cycle diagram, Fig. 8, represent turns of the cutter and shows their relation to one complete rotation of each of feed cam 46 and index cam 84. The line 143 represents the speed of motor 41, point 144 along this line representing the place where track 142 of cam 84 reverses switch 141 to start slow speed operation, 145 the point where the motor attains such slow speed, 146 the point where cam surface 142 again reverses switch 141 to start high speed operation and 147 the point where such high speed is attained. Line 148 represents the feed motion of the sliding base effected by cam track 93 of cam 46. Infeed at the rate employed for rough cutting commences at point 149 and continues, through point 151, to point 152. There follows a dwell, from point 152 to point 153 and then a withdrawal from point 153 through point 154 to point 155. Infeed, at a rapid rate, occurs from point 155 to point 149.

The cutting of a non-generated gear according to the present invention may be summarized as follows: After the machine has been properly adjusted and a workpiece G chucked on the spindle 32, the operator moves lever 122, Figs. 1 and 2, to shift valve 121 to the upward limit position thereof shown in Fig. 4. In this position fluid pressure from pump P is applied to the right face of piston 104 through lines 120 and 130, moving the piston and the sliding base to the left, thereby bringing the workpiece from loading position to cutting position. The chamber between the left face of piston 104 and the right face of piston 107 is on exhaust through lines 140 and 150. Assuming that after a preceding operation the machine has been stopped (by a conventional automatic stop mechanism, not shown) in the usual position, the withdrawal effected by a cam track 93 will have proceeded to about point 154. The piston 107 will be in its right limit position, wherein nut 111 abuts plate 112, because at this time the valve 115 is held in its uppermost position, in Fig. 4, wherein pressure from pump P is applied to the left face of the piston through lines 120 and 160. Although the pump pressure is also being applied to the right face of piston 104, the piston 107 will have moved to the right because, as shown, the effective area of its left face is greater than that of the right face of piston 104.

Upon the starting of motor 41, high speed operation commences immediately. First there is the withdrawal and then the initial advance effected by cam track 93, as shown by the parts of line 148 between points 154, 155 and 149. During this time the indexing action effected by cam 84 and mechanism 82, 83 takes place. At or near point 151 one of roughing blades of the cutter engages the work, and due to the progressive increase in blade height, which constitutes an infeed built into the cutter, the effective infeed proceeds not along line 148, but along the dotted line from point 151 to point 156, point 156 representing the end of the first cutting action of roughing blade 129h. There follows a hiatus in cutting until point 157 when blade 128a again starts to cut. This action is repeated through several turns of the cutter, with blade 129h ending its cutting action at points 158, 161, 163 and 165, and blade 128a resuming its cutting at respectively following points 159, 162, 164 and 166.

At point 152 the dwell of cam track 93 begins, so that there is no cam infeed during the last cutting action of the last few roughing blades, 129g, 128h and 129h in the illustrated example. At point 167, just as the last roughing blade 129h concludes its cutting, cam 119 shifts valve 115, downwardly in Fig. 4 from the position shown, to connect the cylinder chamber at the left end of piston 107 to exhaust through lines 160 and 150, whereupon pump pressure prevailing in the chamber at the right end of piston 104 causes the latter to move to the left until shoulder 108 of piston 107 abuts ring 109. This piston action results in the sliding base 22 being shifted to bring the work gear G into full depth relation to the cutter, so that it is finish cut by blades 138 and 139 at the feed depth indicated by broken line 168. The steep slope of the short line connecting point 167 to line 168 in Fig. 8 shows the abrupt character of this piston-effected furthere or additional infeed which brings the cutter and work gear into their finish-cutting relationship.

Prior to finish cutting, at point 144, the motor 41 is switched to low speed, and such speed is attained at point 145, just before finishing blade 138 starts to cut. At points 169 and 153, which are reached simultaneously, finish cutting blade 139 is ended. At this point cam 119 reverses valve 115, moving it upwardly in Fig. 4 to the position shown, and the feed cam track 93 begins its withdrawal action. Accordingly the workpiece is quickly withdrawn so that the next cutter blade, 128a, clears the workpiece. Simultaneously with the conclusion of finish cutting, at point 146, the motor 41 is switched to high-speed operation. However the high speed is not fully attained until point 147 is reached. At point 154, the first tooth cutting cycle is ended and a new cycle automatically follows, beginning with indexing of the workpiece. The tooth cutting cycles are repeated until every tooth of the gear G has been cut, whereupon the machine is automatically stopped and the operator effects full withdrawal of the sliding base by moving valve handle 122 to shift valve 121 downwardly in Fig. 4 from the position shown. This causes hydraulic pressure to be applied to the left face of piston 104 through lines 120 and 140 and connects the chamber at the right end of the piston to exhaust through lines 130 and 150.

Figs. 9 and 10 illustrate a modified cutter which may be used in place of that shown in Figs. 5 to 7, and in which there are three sets of roughing blades, namely bottom cutting blades 171, outside cutting blades 172, and inside cutting blades 173. The heights of the roughing blades progressively increase, but the bottom cutting blades, one of which precedes each side cutting blade, are of greater height than the adjacent side cutting blades. That is, the tip edges 174 of bottom cutting blades 171 lie along line 175, whereas the tip edges 176 of the side cutting blades 172 and 173 lie along a lower line 177. Line 177 is so much lower than line 175 that despite infeed by feed cam track 93, the tip edges 176 clear the workpiece, and the bottoms of the tooth gaps are cut entirely by the edges 174 of blades 171. The infeed effected by the cam track is indicated by line 178 and is of such magnitude that after one turn of the cutter the first roughing blade, 171a, which would be at position 171a' without such infeed, is in effect at position 171a". The combined effect of the builtin cutter feed along line 175 resulting from progressive increase in blade height and the infeed caused by the feed cam, is to bring the cutting edges 174 to a line 179, and to cause the first roughing blade, at effective position 171a''' to remove only the same thickness of stock as the other blades 171. As shown in Fig. 10 the side-cutting edges 181 of blades 172 and 173 project beyond the side edges of the blades 171 so that the latter blades do no side cutting. Also the clearance side edges 182 of blades 172 and 173 are inset enough that they do no cutting. Following the last roughing blade, the cutter has an outside finishing blade 183 and an inside finishing blade 184, these being of an equal height that is so much less than that of the last roughing blades that, despite the cam-effected infeed, they do not come into operation until the occurrence of the finishing infeed effected the auxiliary feed means comprising piston 107, at which time they advance to effective positions 183' and 184' in Fig. 9. In this position their side-cutting edges, but not their top edges, remove stock from the workpiece. It will be noted that blades 183 and 184 are more closely spaced than corresponding blades 138 and 139 in Fig. 7, this being for the reason that the cutter shown in Fig. 9 is intended for cutting gears of relatively shorter face width than the cutter shown in Fig. 7.

It will be understood that in Figs. 9 and 10, and also in Figs. 6, 7 and 8, the magnitude of the feed motions and the progressive increase in height of the blades is greatly exaggerated for the purpose of illustration. In practice, in a typical case, the total effective infeed, reflected by line 179 in Fig. 9, may be such that each bottom cutting blade 171 removes stock of a thickness of about five thousands of an inch (0.005").

Having now described the invention, what is claimed is:

1. A gear cutting machine or the like employing a rotary cutter adapted to rough and finish cut a tooth side of a workpiece during each cutting cycle of the machine, the machine having means for effecting during each such cycle a continuous relative infeed between the cutter and the workpiece in time with cutter rotation and extending over a plurality of revolutions of the cutter, the cutter having around its circumference a plurality of uniformly spaced roughing blades and at least one finishing blade interposed between the last and the first roughing blades whereby said last and said first blades are more widely spaced than are the other roughing blades, and said roughing blades progressively varying in height by an amount such that no one of them will remove a substantially greater thickness of stock from the workpiece during said infeed than the others thereof.

2. A machine according to claim 1 in which said cutter is of the face mill type, with the blades extending from the cutter body in the general direction of the axis of cutter rotation, and in which the infeed is at least approximately in the direction of said axis.

3. A machine according to claim 1 in which there are alternate side-cutting roughing blades arranged to cut on opposite sides of a tooth space of the workpiece, and between adjacent side-cutting blades there is a bottom-cutting roughing blade, the height of each bottom-cutting blade being sufficiently greater than that of the following side-cutting blade that the latter will clear the tooth bottom, and the width and lateral disposition of each side-cutting blade being such that the following bottom-cutting blade will clear the tooth side.

4. A machine according to claim 1 in which alternate roughing blades are arranged to cut on opposite sides of a tooth space of the workpiece.

5. A machine according to claim 4 in which there is a separate finishing blade for each side of the tooth space being cut, and both of said finishing blades are disposed between the last roughing blade and the first roughing blade.

6. A gear cutting machine or the like employing a rotary cutter adapted to rough and finish cut a tooth side of a workpiece in each cutting cycle of the machine, the machine having means for effecting during each such cycle a continuous relative infeed between the cutter and the workpiece in time with cutter rotation and extending over a plurality of revolutions of the cutter, the cutter having around its circumference a plurality of roughing blades and at least one finishing blade interposed between the last and first roughing blades, the finishing blade being of such height and width as to clear the workpiece during said infeed, and the machine having means for effecting a further infeed between the cutter and the workpiece after the last roughing blade has cut at the conclusion of each first-mentioned infeed, said further infeed being of such magnitude that the finishing blade may cut on at least one side edge thereof.

7. A machine according to claim 6 in which the means for effecting the first-mentioned infeed comprises a cam arranged to make one revolution for each tooth cutting cycle of the machine, said cam having a dwell portion succeeding the infeed portion thereof, and said means for effecting the further infeed being arranged to operate in such time relation to said cam that the finishing blade cuts during said dwell.

8. A machine according to claim 6 in which said means for effecting the further infeed comprises a fluid pressure operated device and a reversing valve therefor operated in time with the means for effecting said first-mentioned infeed.

9. A rotary cutter for gears and the like, adapted to both rough and finish cut by a cutting cycle wherein rough cutting occurs during a continuous relative infeed, between the cutter and a workpiece, which extends over several revolutions of the cutter, said cutter being characterized by having arranged around the circumference thereof a series of roughing blades and at least one finishing blade interposed between the last and first roughing blades whereby these two blades are more widely spaced than other adjacent roughing blades, and said roughing blades progressively varying in height in such relation to the rate of infeed that during such infeed the thickness of successive cuts taken by said first blade will be substantially the same as those taken by the other roughing blades.

10. A rotary cutter according to claim 9 in which alternate blades of the series are arranged to cut on opposite sides of a tooth space of the workpiece.

11. A rotary cutter according to claim 10 in which there is a second series of roughing blades in the cutter, one blade of the second series preceding every blade of the first-mentioned series every blade of the second series being so much higher than the following blade of the first-mentioned series that such following blade will clear the bottom of the tooth space during said feed motion.

12. A rotary face mill cutter for gears and the like, adapted to rough and finish cut by a cutting cycle wherein rough cutting occurs during a continuous relative infeed, between the cutter and a workpiece, which extends over several revolutions of the cutter, said cutter being characterized by having arranged around the circumference thereof a series of roughing blades and at least one finishing blade interposed between the last and first roughing blades whereby these two blades are more widely spaced than other adjacent roughing blades, said roughing blades progressively varying in height in such relation to the rate of infeed that during such infeed the thickness of successive cuts taken by said first blade will be substantially the same as those taken by the other roughing blades, and the side cutting edge of the finishing blade being inset from that of the last roughing blade by a distance such that said finishing blade will clear the workpiece during said infeed.

13. The method of cutting a gear with a rotary cutter having progressively higher roughing blades and at least one finishing blade of lesser height than the last roughing blade and arranged between said last roughing blade and the first roughing blade, which method comprises effecting a continuous relative infeed between the cutter and a workpiece during a plurality of revolutions of the cutter, said infeed being at such rate relative to rotation of the cutter that the first roughing blade will take substantially the same thickness of cut as the other roughing blades, then, at the conclusion of such infeed and after the last roughing blade has cut, effecting a further infeed to cause the finishing blade to cut, and then effecting a relative withdrawal of the cutter and workpiece to cause the roughing blades to clear the finish-cut tooth space of the workpiece.

14. A gear cutting machine or the like comprising a multi-bladed rotary cutter and a work support, feed means for effecting relative infeed of the cutter and work support and then a relative withdrawal of them, the cutter having a plurality of roughing blades so arranged that without such infeed they would cut progressively deeper as the cutter turns through one revolution, and the cutter having at least one finishing blade disposed between the last and the first roughing blades and so arranged as to clear the work during said relative infeed, and auxiliary feed means to effect a further relative infeed and then a return withdrawal between the cutter and work support, and means for causing said auxiliary feed means to operate after the last roughing blade has cut at the conclusion of said first-mentioned infeed.

15. A machine according to claim 14 in which first-mentioned feed means is arranged to provide a dwell following the infeed effected thereby and said auxiliary feed means is arranged to effect such further infeed during said dwell.

16. A machine to claim 14 in which the first-mentioned feed means comprises a rotary cam geared to the cutter to make one revolution during each tooth cutting cycle of the machine while the cutter makes a plurality of revolutions.

17. A machine according to claim 14 in which the auxiliary feed means comprises a fluid actuated piston-cylinder device and a control therefor operated in time with said first-mentioned feed means.

18. A machine according to claim 14 in which there is a variable speed drive for the cutter and said first-mentioned feed means, and means for varying said drive speed in such time relation with operation of the feed means that the drive is relatively slow during said dwell when the finishing blade is cutting and relatively fast during the relative infeed effected by said first-mentioned feed means.

19. A machine according to claim 18 in which said drive comprises a two-speed motor, and the means for varying the drive speed comprises a switch operated in time with said first-mentioned feed means.

20. A gear cutting machine or the like having a rotary cutter provided with both roughing and finishing blades and having feed means for effecting a relative infeed between the cutter and work while said roughing blades are cutting, the feed means and the cutter blade being so arranged that the finishing blades cut only at the conclusion of said infeed after a number of revolutions of the cutter, and a variable speed drive for said cutter so co-ordinated with the feed means as to rotate the cutter at a relatively slow speed while said finishing blades are cutting.

21. A gear cutting machine having a work support and a rotary cutter provided with circularly arranged roughing blades and finishing blades, and feed means for effecting a relative feed between said support and said cutter in the direction of the cutter axis as the cutter rotates through a plurality of turns in each tooth cutting cycle, said finishing blades being inset with respect to the preceding roughing blades so as not to cut while the relative feed to full roughing depth is being effected, and said feed means being arranged to effect an additional infeed to enable said finishing blades to cut during the last cutting revolution, said additional infeed taking place after the roughing blades which immediately precede the finishing blades have cut during said last cutting revolution.

22. A rotary face mill cutter for gears and the like, and adapted to rough and finish cut a tooth space during each cutting cycle thereof comprising a plurality of revolutions during which there is a relative infeed between the cutter and the workpiece, said cutter having arranged around the circumference thereof a plurality of alternate outside and inside cutting roughing blades spaced equally from each other, and one outside finish cutting blade and one inside finish cutting blade arranged between the last and first roughing blades, the side cutting edges of the finish cutting blades being inset with respect to the last two preceding roughing blades so as not to cut except upon a terminal infeed occurring after the cutting action of said last two preceding roughing blades during the last revolution of each cutting cycle.

23. The method of cutting a gear with a rotary cutter provided with circularly arranged roughing blades and at least one finishing blade interposed between the last and first roughing blades and inset with respect to said last roughing blade, which method comprises effecting in each tooth cutting cycle a relative infeed between the cutter and workpiece while the cutter rotates through a plurality of turns, with the velocities of the infeed and the cutter rotation so related to the distance by which the finishing blade is inset such that all of the roughing blades but not the finishing blade will cut, then, at the conclusion of such infeed, after the last cut of the last roughing blade, effecting a further infeed to cause the finishing blade to cut, and then effecting a relative withdrawal of the cutter to cause the roughing blades to clear the workpiece.

24. A gear cutting machine having a work support and a rotary cutter provided with circularly arranged roughing blades and at least one finishing blade, and feed means for effecting a relative feed between said support and said cutter in the direction of the cutter axis as the cutter rotates through a plurality of turns in each tooth cutting cycle, said finishing blade being inset with respect to the last preceding roughing blade for the same tooth side so as not to cut while the relative feed to full roughing depth is being effected, and said feed means being arranged to effect a further infeed to enable said finishing blade to cut during the last cutting revolution, said further infeed taking place after the roughing blade which immediately precedes the finishing blade has cut during said last cutting revolution.

25. A rotary face mill cutter for gears and the like, and adapted to rough and finish cut a tooth space during each cutting cycle thereof comprising a plurality of revolutions during which there is a relative infeed between the cutter and the workpiece, said cutter having arranged around the circumference thereof a plurality of roughing blades arranged to cut both sides and the bottom of the tooth space, and at least one finish cutting blade arranged between the last and first roughing blades, the side cutting edge of the finish cutting blade being inset with respect to the last preceding roughing blade for the same tooth side so as not to cut except upon a terminal infeed occurring after the cutting action of said last preceding roughing blade during the last revolution of each cutting cycle.

References Cited in the file of this patent

UNITED STATES PATENTS

| | | | |
|---|---|---|---|
| 2,126,004 | Gleason | Aug. 9, | 1938 |
| 2,268,326 | Stewart et al. | Dec. 30, | 1941 |
| 2,273,908 | Stewart | Feb. 24, | 1942 |
| 2,302,004 | Carlsen | Nov. 17, | 1942 |
| 2,346,806 | Wildhaber | Apr. 18, | 1944 |
| 2,508,556 | Wildhaber | May 23, | 1950 |
| 2,634,657 | Aschwanden | Apr. 14, | 1953 |
| 2,665,472 | Aschwanden et al. | Jan. 12, | 1954 |
| 2,725,792 | Wildhaber | Dec. 6, | 1955 |
| 2,783,686 | Ciallie et al. | Mar. 5, | 1957 |